(12) United States Patent
Bailey et al.

(10) Patent No.: US 10,042,415 B2
(45) Date of Patent: Aug. 7, 2018

(54) METHODS AND APPARATUSES FOR COMPUTER POWER DOWN

(71) Applicant: AVAGO TECHNOLOGIES GENERAL IP (SINGAPORE) PTE. LTD., Singapore (SG)

(72) Inventors: Stephen Wilson Bailey, Palo Alto, CA (US); Karen Marie Schramm, Needham, MA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 838 days.

(21) Appl. No.: 13/893,757

(22) Filed: May 14, 2013

(65) Prior Publication Data
US 2014/0289549 A1    Sep. 25, 2014

Related U.S. Application Data

(60) Provisional application No. 61/804,116, filed on Mar. 21, 2013.

(51) Int. Cl.
| | |
|---|---|
| *G06F 1/00* | (2006.01) |
| *G06F 1/32* | (2006.01) |
| *H04L 12/701* | (2013.01) |
| *H04L 29/06* | (2006.01) |
| *H04W 52/02* | (2009.01) |
| *H04L 12/24* | (2006.01) |

(52) U.S. Cl.
CPC ............ *G06F 1/3296* (2013.01); *G06F 1/324* (2013.01); *G06F 1/3278* (2013.01); *G06F 1/3287* (2013.01); *H04L 41/0833* (2013.01); *H04L 45/00* (2013.01); *H04L 63/0414* (2013.01); *H04L 63/1416* (2013.01); *H04W 52/028* (2013.01); *H04W 52/0225* (2013.01); *Y02D 10/126* (2018.01); *Y02D 10/157* (2018.01); *Y02D 10/171* (2018.01); *Y02D 50/20* (2018.01)

(58) Field of Classification Search
CPC ...... G06F 1/324; G06F 1/3278; G06F 1/3287; G06F 1/3296; G06F 1/3209; Y02B 60/1217; Y02B 60/126; Y02B 60/1282; Y02B 60/32; H04L 45/00; H04W 52/028
See application file for complete search history.

(56) References Cited

U.S. PATENT DOCUMENTS

| | | | | |
|---|---|---|---|---|
| 7,809,969 | B2 * | 10/2010 | Das Sharma | G06F 1/3203 710/305 |
| 8,127,162 | B2 * | 2/2012 | Satoh | 713/322 |
| 8,811,208 | B2 * | 8/2014 | Johnsson | H04L 41/0833 370/252 |
| 9,092,223 | B1 * | 7/2015 | Pani | G06F 1/3209 |
| 9,123,237 | B2 * | 9/2015 | Smith | G08C 17/02 |
| 2007/0240003 | A1 * | 10/2007 | Watts, Jr. | G06F 1/206 713/322 |
| 2007/0277048 | A1 * | 11/2007 | Yamasaki | G06F 1/3203 713/310 |
| 2008/0127192 | A1 * | 5/2008 | Capps et al. | 718/103 |

(Continued)

*Primary Examiner* — Xuxing Chen
(74) *Attorney, Agent, or Firm* — Oblon, McClelland, Maier & Neustadt, L.L.P.

(57) ABSTRACT

The discussion makes reference to methods and apparatuses for network controlled computer power down. The link layer in computer networking can be used to save power in computers.

20 Claims, 4 Drawing Sheets

(56) References Cited

U.S. PATENT DOCUMENTS

2009/0193109 A1* 7/2009 Kuo .................. G06F 1/3209
  709/223
2012/0198246 A1* 8/2012 German ................ H04Q 1/136
  713/300

* cited by examiner

METHODS AND APPARATUSES FOR COMPUTER POWER DOWN

PRIORITY CLAIM

This application claims priority to U.S. Provisional Application Ser. No. 61/804,116, filed Mar. 21, 2013, which is incorporated herein by reference in its entirety.

TECHNICAL FIELD

This disclosure relates to methods and apparatuses for network controlled computer power down.

BACKGROUND

Energy-Efficient Ethernet (EEE) is a set of enhancements to the Ethernet family of computer networking standards that allow for less power consumption during periods of low data activity. The intention is to reduce power consumption while retaining compatibility with existing equipment. The Institute of Electrical and Electronics Engineers (IEEE), through the IEEE 802.3az task force developed the standard.

To save energy, in 100 Mbit/s and faster Ethernet data links can be put into sleep mode when no data is being sent. By sending a low-power-idle (LPI) indication signal for a specified time the transmit chips in the system can be turned off. LPI is sent periodically to refresh the sleep mode. When there is data to transmit a normal idle signal can be sent to wake the transmit system. The data link layer is considered to be always operational, as the receive signal circuit remains active even when the transmit path is in sleep mode.

BRIEF DESCRIPTION OF THE DRAWINGS

The innovation may be better understood with reference to the following drawings and description. In the figures, like reference numerals can designate corresponding parts throughout the different views.

DETAILED DESCRIPTION

The discussion makes reference to methods and apparatuses for network controlled computer power down, message-driven switch power, power control, and central processing unit (CPU)-assisted full switch power-down. The link layer in computer networking can be used to save power in switching elements and computers.

Figure 1:
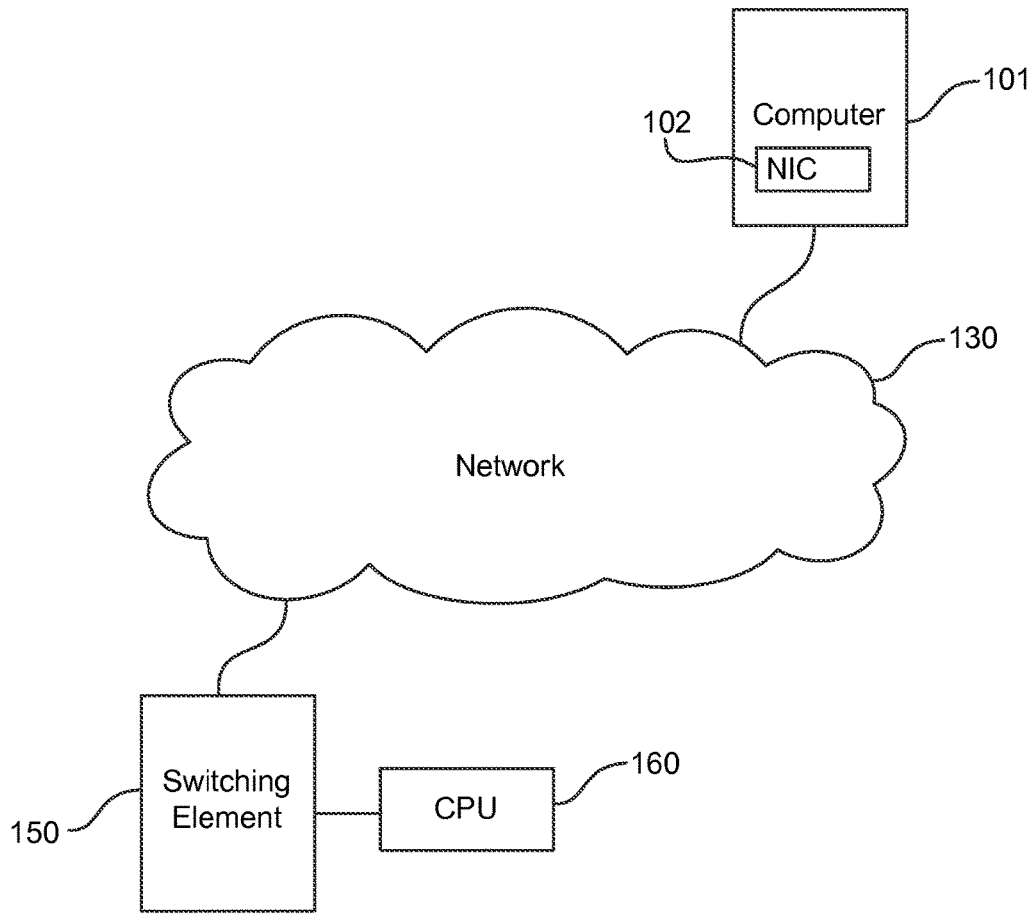
FIG. 1 is a block diagram of an exemplary network system.

FIG. 1 is a block diagram of an exemplary network system 100. The network system 100 can include a computer 101 connected to a communication network 130, e.g., data center network, via a network interface card (NIC) 102. A status message received from the network 130 regarding a state of the network 130 can be used control power to the computer 101 and/or a switching element 150. The computer 101 can be part of a plurality of servers at the data center for example. Internet data center servers or home servers, for example, may only need to be active when processing requests from the switches on the network 130. Other examples of such networks include any Ethernet network-driven computation application, including data center and cloud computing servers, desktop clients and even low-power embedded nodes such as remote sensors that can be awakened as needed based on orchestration from the network 130.

The NIC 102 can change a power state of the computer, e.g., wake, suspend, hibernate, etc. depending on the message from the network 130. As used herein, the Institute of Electrical and Electronics Engineers energy efficient Ethernet (IEEE EEE) 802.3az standard, or other network messaging system that can provide messages of quiescence, etc. of the network 130 with a negotiable wake up time interval can be used. Power can be saved in a data center without any infrastructure modification by turning inactive servers down or off. The network system 100 can also include switching elements 150 to accommodate sending messages to the computer 101 over the communication network 130 the network system 101. The switching element 150 can include a CPU 160 to aid with processing of packets.

Figure 2:
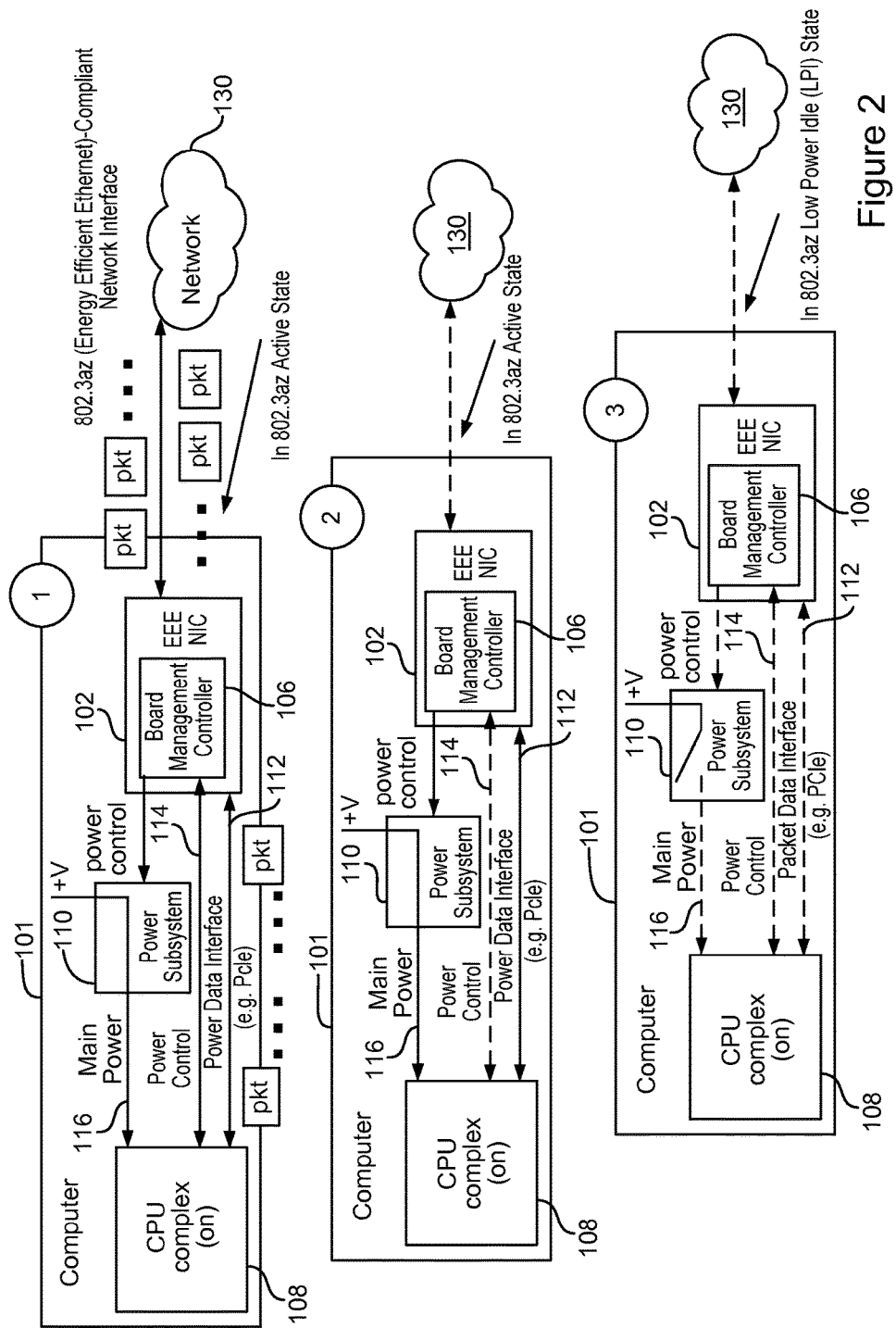
FIG. 2 is a block diagram of an exemplary network controlled computer power-down from an on-to-off state.

FIG. 2 is a block diagram of an exemplary controlled power-down of the computer 101 from on-to-off based on a state of the network 130. The computer 101, e.g. data center cloud servers, whose primary function is to process requests from network 130, can be powered off, down or on based on a combination of network based idle signaling and application or operating system-originated keep-alive messaging. An exemplary network based idle signaling is described in IEEE EEE. The network-based power control can allow greater power savings than current mechanisms that are based alone on indications that are local to the computer 101.

The computer 101 can include the NIC 102 for receiving messages from the network 130. The network 130 can include devices including data center switches and head ends. When the network 130 is active it can send messages, e.g., IEEE 802.3az type messages, to indicate the active state. The messages can be packet (pkt) based for example. A board management controller 106 of the NIC 102 can process the messages, e.g., to determine a state of the network 130. The board management controller 106 can be part of the NIC circuitry or implemented separate from the NIC circuitry. For example, the network can be operating in an active state, a lower power idle (LPI) state and a hold state. While the network 130 is operating in an active state, the NIC 102 or the board management controller 106 can control a power switch 110, e.g., a power subsystem, to power a processing unit, e.g., a CPU complex 108 of the computer 101. To power the CPU complex 108, the board management controller 108 can produce and send a power control message to the power switch 110. The power switch 110 can supply main power +V to a CPU complex 108.

In stage 1, the CPU complex 108 is powered on and the network 130 is active. The network 130 can send an active state message via the NIC 102 of the computer 101. Data packets can be sent between the network 130 and the NIC 102 and the NIC 102 and the CPU complex 108. A packet data interface 112, e.g., Peripheral Component Interconnect Express (PCIe), can route the data messages between the CPU complex 108 and the NIC 106. The computer 101 can also include a power control interface 114 to send power messages to and from the CPU complex 108 and the NIC 102. The CPU complex 108 may also remain powered on if the network 130 is operating in the LPI state and the CPU complex 108 is asserting keep-alive status as described in FIG. 2.

In stage 2, the network 130 enters a low power idle state and can send an LPI state message to the NIC 102 to indicate that the network 130 transitioned from an active to an idle state. The NIC 102 can send a power control message 114 to the CPU complex 108 to notify to CPU complex 108 that the CPU complex 108 is being turned off to enter a sleep state. The messaging can include messages under the IEEE EEE standard for conserving energy. In stage 3, the state of the CPU complex 108 is turned off, e.g., in standby, hibernate or completely off modes. The main power 116 to the CPU complex 108, power control 114 and packet data interface 112 can all be turned off. The NIC 106 can await a message from a switch in the network 130 to transition from LPI to hold.

Figure 3:
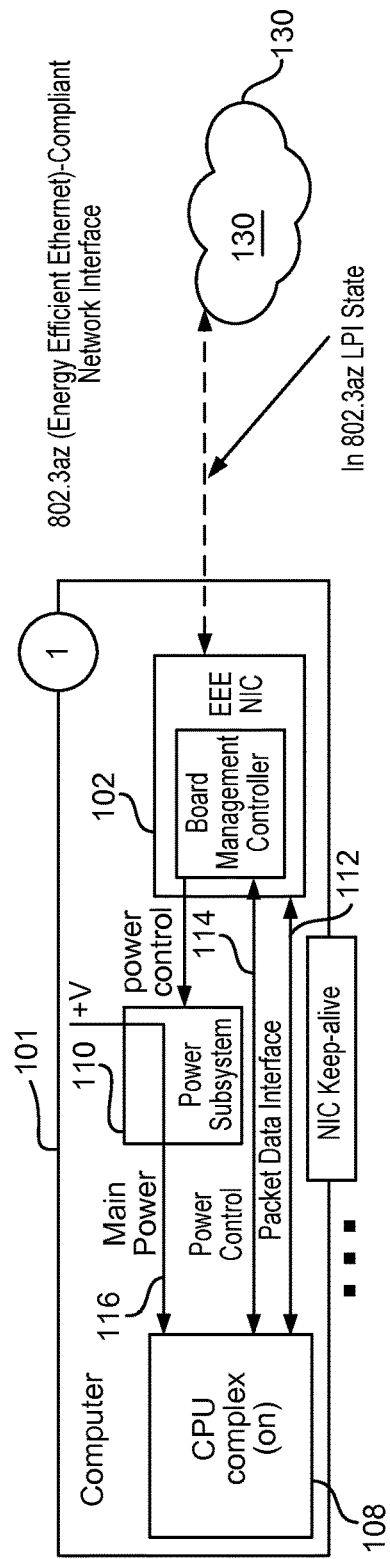
FIG. 3 is a block diagram of an exemplary computer usage during a network low power idle state.

FIG. 3 is a block diagram of an exemplary computer usage during the network LPI state. The NIC 102 can utilize the LPI state to save network power while the CPU complex 108 is performing a computation and the network 130 is idle. Before shutting down, the CPU complex 108 can send keep-alive messages, e.g., packets, to the NIC 102 so that the NIC 108 does not shut down power to the CPU complex 108 while performing the computation to ensure that the computer power state is not changed as long as it is processing an active request from the network 130. The keep-alive mechanism can also be driven by the union of many factors, including ongoing computation and external inputs, e.g., keystrokes, sensor information, periodic activity timers, etc.

The keep-alive messages can be sent continuously or periodically, e.g., every 500 ms, from the CPU complex 108 to the NIC 102 via the packet data interface 112. The messages may be controlled by CPU infrastructure hardware, e.g., basic input output system (BIOS)/hypervisor/operating system, or application software. When the CPU complex 108 sends the keep-alive messages the NIC 102 continues to power the CPU complex 108 even while receiving the LPI state message form the network 130.

Figure 4:
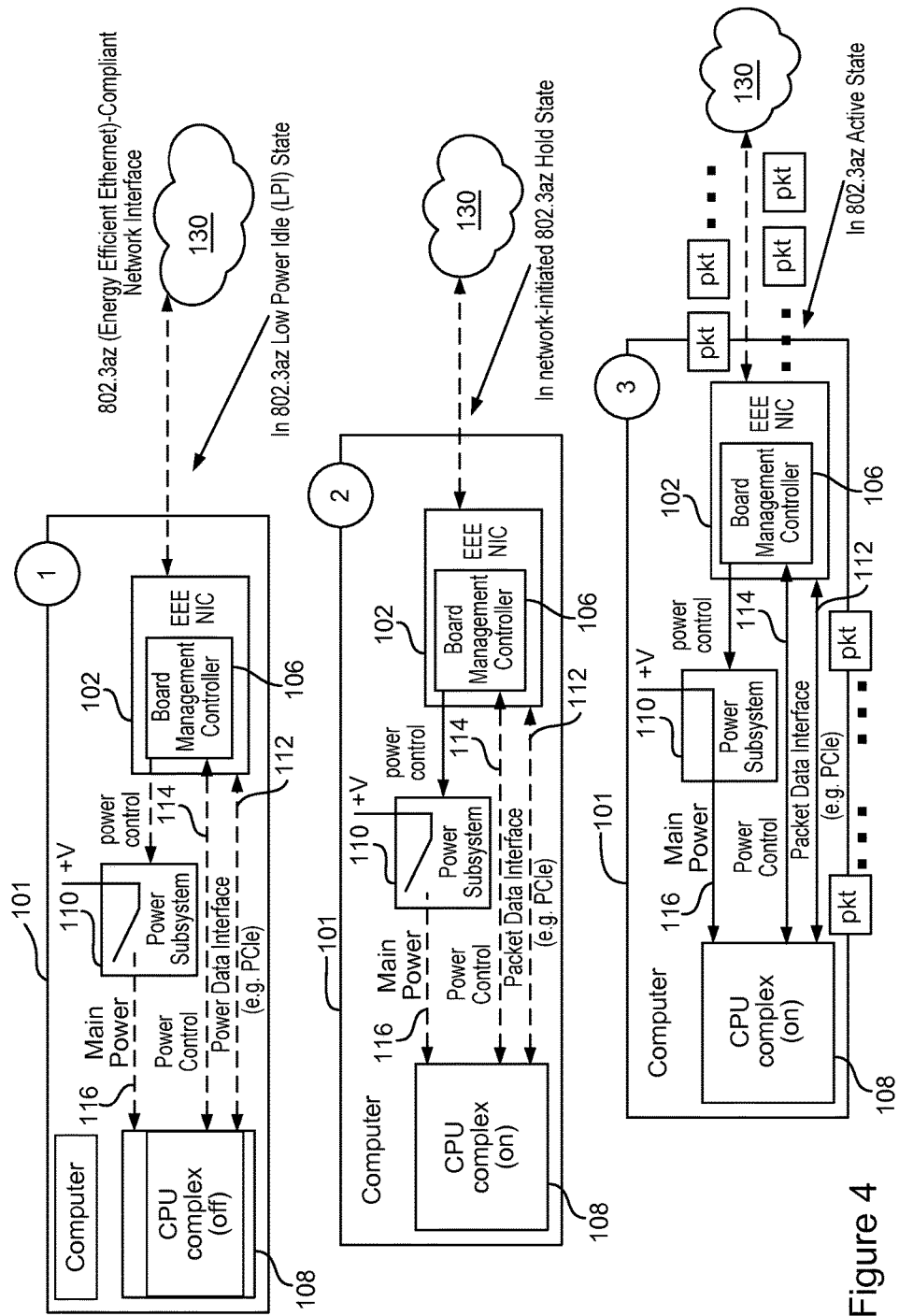
FIG. 4 is a block diagram of an exemplary network controlled off-to-on transition.

FIG. 4 is a block diagram of an exemplary controlled power-up of the computer 101 from off-to-on based on a state of the network 130. In stage 1, when packets destined for the computer 101 become available on the network 130, the network 130 can change the state message sent to the NIC 102 from LPI to hold. The CPU complex 108 is currently in a powered down state. In stage 2, the hold state, the board management controller 106 of the NIC 102 can send a power control signal to the power switch 110 to supply main power to the CPU complex 108. The power switch 110 can switch on main power +V to the CPU complex 108. In stage 3, with the CPU complex 108 powered on, packet flow and computation can begin and the network 130 can enter the active state.

Use of the power saving systems and methods can be detected, e.g., by measuring power consumption of the computer 101 or observing the power state, which can be done with electrical or software messages that are detectable in the computing platform. If the computer power is observed to be reduced when the network interface enters the IEEE 802.3az LPI state and the computer 101 is not performing some local computation, and the computer power is observed to increase when the network interface enters the IEEE 802.3az active state, then methods and system may be in use.

Unlike the present systems and methods, other power-down techniques may not include any pro-active indication of network activity. A network packet could arrive at a computer at any time, without prior notice. The computer 101 may power down based on decreased or absent local computational activity at a time when a network request is about to arrive at the computer 101. In this case the incoming packets may be dropped, or the computer 101 never powers down to avoid missing or being otherwise unresponsive to a network request. The IEEE 802.3az mechanism provides for end-to-end network activity signaling with configurable turn-on and turn-off times so that network traffic is never missed or lost. The systems and methods can enable saving more power compared to previous alternatives which use only computer-local power-down criteria. The systems and methods can also enable network-orchestrated power-up and power-down. A wake-on-LAN mechanism can allow the computer 101 to be powered up from the network 130, but may not provide any mechanism for the computer 101 to be powered down from the network. The systems and provide a complete framework for network-based computer power management.

While various embodiments have been described, many more embodiments and implementations are possible. Accordingly, the description is not to be restricted.

What is claimed is:

1. A computer system, comprising:
a network interface controller configured to establish respective communication links over a network with a plurality of switch devices that process packets; and
a processing unit connected with the network interface controller, the processing unit being connected to the network via the network interface controller, the network interface controller configured to control power to the processing unit, the power to the processing unit being reduced in response to receipt, by the network interface controller, of a determined network state message received over the network from at least one of the switch devices, the determined network state message being a proactive indication of a reduced activity level of data packet transmission over a respective communication link between the network interface controller and the at least one of the switch devices,
wherein the network interface controller is configured to delay the reduction in power to the processing unit in response to receipt of a keep alive message packet from the processing unit.

2. The computer system of claim 1, wherein the at least one of the switch devices from which the determined network state message is received over the network comprises a local area network switch connected with the network interface controller via the respective communication link.

3. The computer system of claim 1, wherein the determined network state message comprises an idle network message indicating communication over the network has transitioned from an active state to an idle state.

4. The computer system of claim 3, further comprising the network interface controller configured to generate a power control notification message to notify the processing unit of a reduction in power supplied to the processing unit in response to receipt of the idle network message, the network interface controller further configured to delay the reduction in power when the processing unit is performing a local computation.

5. The computer system of claim 4, wherein the processing unit is configured to generate the keep alive message packet in response to the processing unit being in a state of performing computations for a previously received request at a time when the power control message is received.

6. The computer system of claim 1, wherein the network interface controller is configured to increase power to the processing unit from a reduced power condition of a sleep state of the processing unit in response to receipt of another determined network state message, the another determined network state message being a hold state message received by the network interface controller from over the network.

7. The computer system of claim 1, wherein the network interface controller is configured to completely turn off power to the processing unit in response to receipt of the determined network state message.

8. The computer system of claim 1, wherein the processing unit comprises a central processing unit complex of a computer server.

9. The computer system of claim 1, wherein the network interface controller includes a board management controller configured to control the power.

10. The computer system of claim 9, wherein the board management controller is implemented separate from a circuitry of the network interface controller.

11. A computer, comprising:
   a processing unit configured to perform computer computations;
   a power switch connected with the processing unit and configured to switch power to the central processing unit; and
   a network interface controller connected with the power switch and in communication, over a network, with a switch device that processes packets, the processing unit being connected to the network via the network interface controller, the network interface controller configured to receive a status message from the switch device over the network, the status message being a message of quiescence of packet communication activity over the network between the switch device and the network interface controller,
   wherein the network interface controller is configured to control the power switch to reduce power to the processing unit in accordance with the message of quiescence of packet communication activity over the network received in the status message, and
   wherein the network interface controller is configured to delay the reduction in power to the processing unit in response to receipt of a keep alive message packet from the processing unit.

12. The computer of claim 11, wherein the power switch is configured to completely turn off power to the processing unit in response to receipt by the network interface controller of the message of quiescence of packet communication activity from the switch device.

13. The computer of claim 11, wherein the processing unit is configured to send keep alive message packet over a packet data interface to the network interface controller when the processing unit is performing computations so that the network interface controller delays control of the power switch to reduce power to the processing unit.

14. The computer of claim 11, wherein the network interface controller includes a board management controller configured to control the power switch.

15. The computer of claim 14, wherein the board management controller is implemented separate from a circuitry of the network interface controller.

16. A method for reducing power consumed by a computer, comprising:
   receiving, with a network interface controller, a status message, the status message received over a network from a switch device that processes packets, the status message indicating a reduced level of data packet transfer activity between the network interface controller and the switch device;
   processing, by the network interface controller, the status message to determine an activity state of the network is transitioning from an active state to an idle state; and
   adjusting, by the network interface controller, power to a processing unit to reduce an amount of power to the processing unit based on the determined activity state of the network transitioning from the active state to the idle state, the network interface controller connecting the processing unit to the network,
   wherein the reduction in power to the processing unit is delayed in response to receipt of a keep alive message packet from the processing unit.

17. The method of claim 16, wherein the keep alive message packet generated by the processing unit so that power to the processing unit is not adjusted by the network interface controller.

18. The method of claim 16, wherein adjusting, by the network interface controller, power to a processing unit to reduce an amount of power to the processing unit comprises powering off the processing unit, and the method further comprising receiving, by the network interface controller, from over the network, another status message indicating an increased level of data packet transfer activity between the network interface controller and the switched device; the network interface controller turning on power to the processing unit based on the another status message so that the network can transition from the idle state to the active state.

19. The method of claim 16, wherein adjusting, by the network interface controller, power to a processing unit to reduce an amount of power to the processing unit comprises the network interface controller, completely turning off power to the processing unit while the network is in the idle state.

20. The method of claim 16, further comprising:
   processing a request with the processing unit, the request received from the switch device over the network prior to receipt of the status message; and
   generating, by the processing unit, the keep alive message packet, and transmitting the keep alive message to the network interface controller while the processing unit is processing the request so that the network interface controller will not reduce the amount of power to the processing unit.

* * * * *